Oct. 4, 1966　　　　　G. B. SPEEN　　　　3,276,270
COMBINED GYROSCOPE AND ACCELEROMETER
Filed April 2, 1962　　　　　　　　　　6 Sheets-Sheet 1
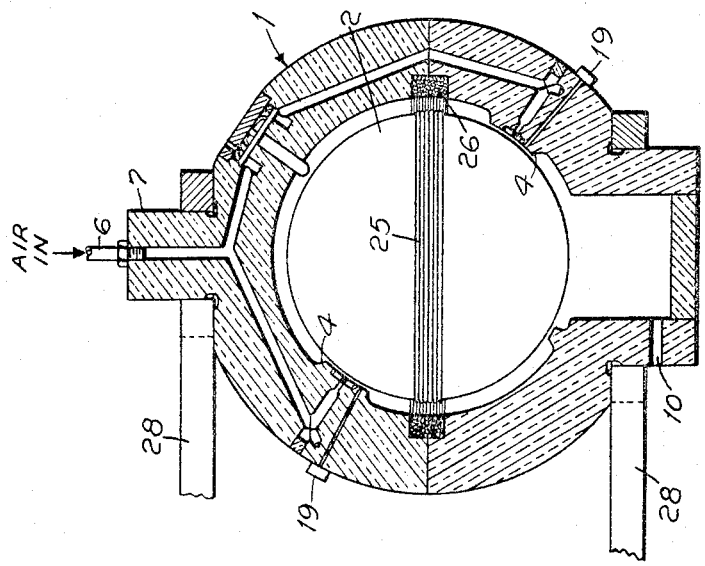
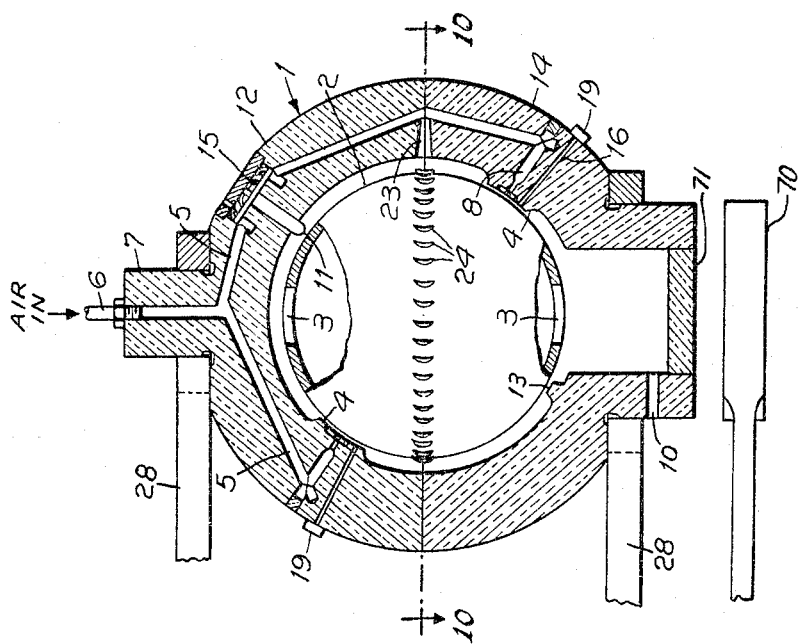
INVENTOR.
GERALD B. SPEEN
BY
*Isadore Togut*
ATTORNEY

INVENTOR.
GERALD B. SPEEN

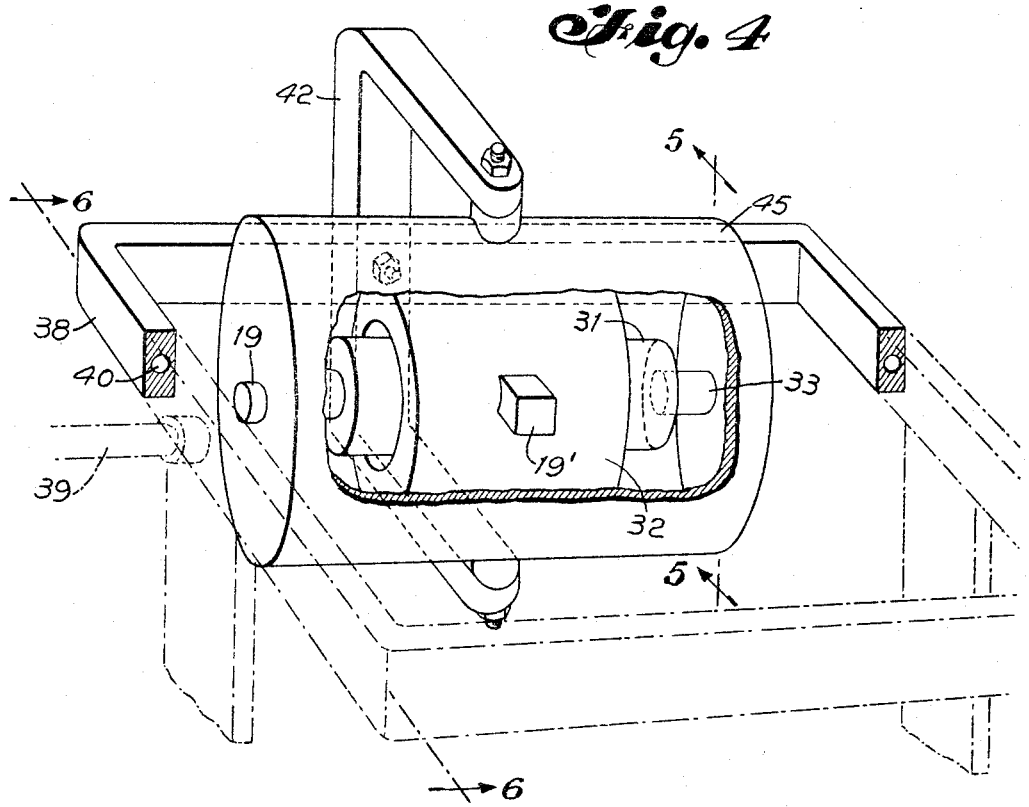
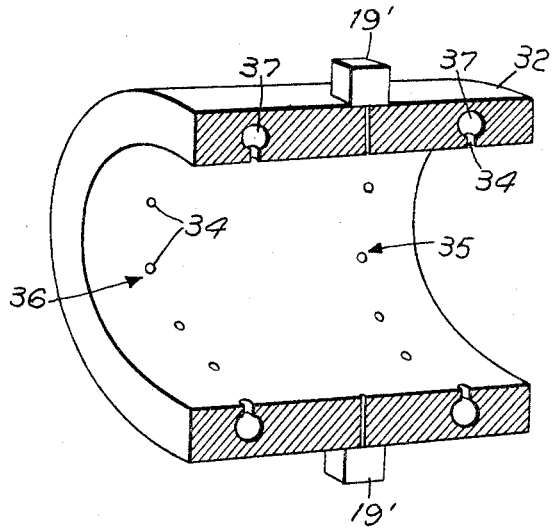

Oct. 4, 1966  G. B. SPEEN  3,276,270
COMBINED GYROSCOPE AND ACCELEROMETER
Filed April 2, 1963  6 Sheets-Sheet 4
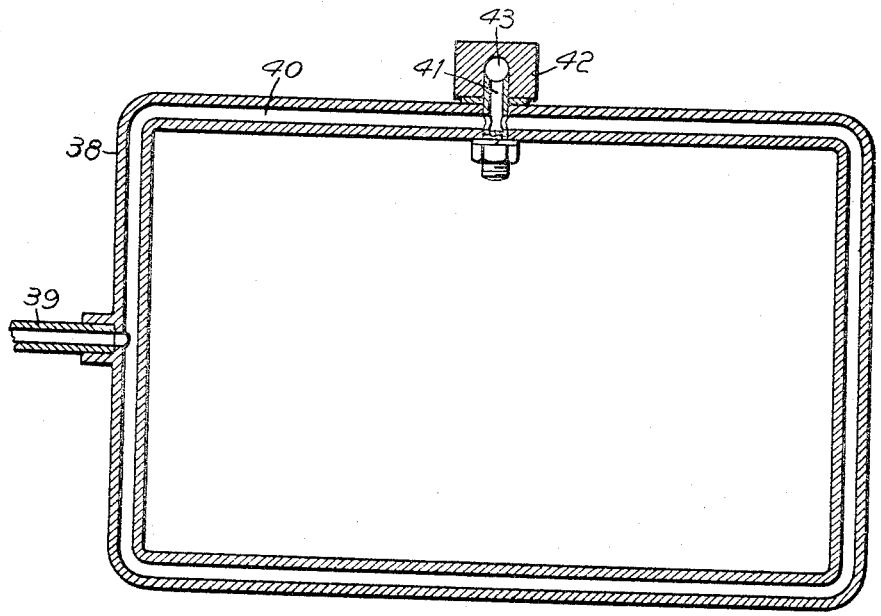
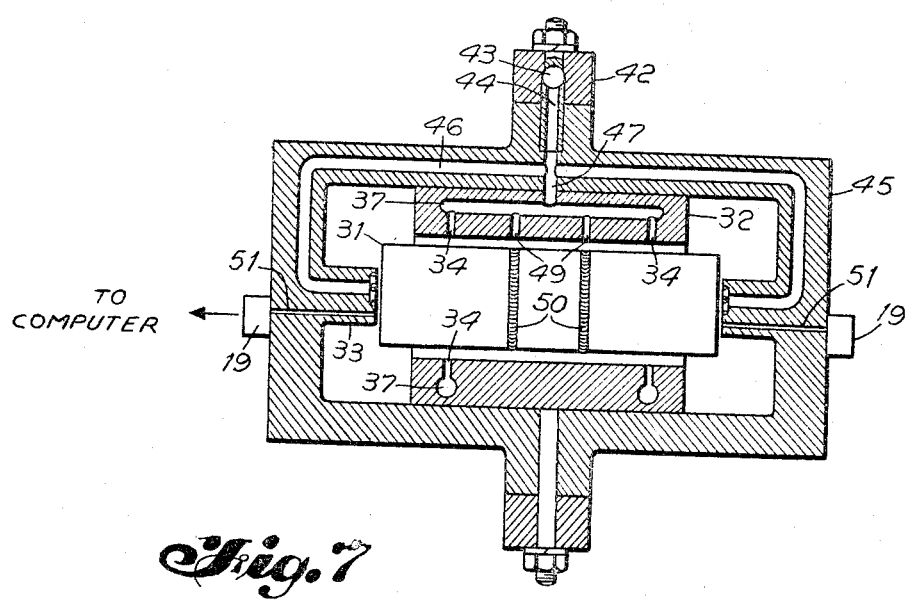
INVENTOR.
GERALD B. SPEEN
BY
ATTORNEY Oct. 4, 1966  G. B. SPEEN  3,276,270
COMBINED GYROSCOPE AND ACCELEROMETER
Filed April 2, 1962  6 Sheets-Sheet 5

INVENTOR.
GERALD B. SPEEN
BY
ATTORNEY

Oct. 4, 1966  G. B. SPEEN  3,276,270
COMBINED GYROSCOPE AND ACCELEROMETER
Filed April 2, 1962  6 Sheets-Sheet 6
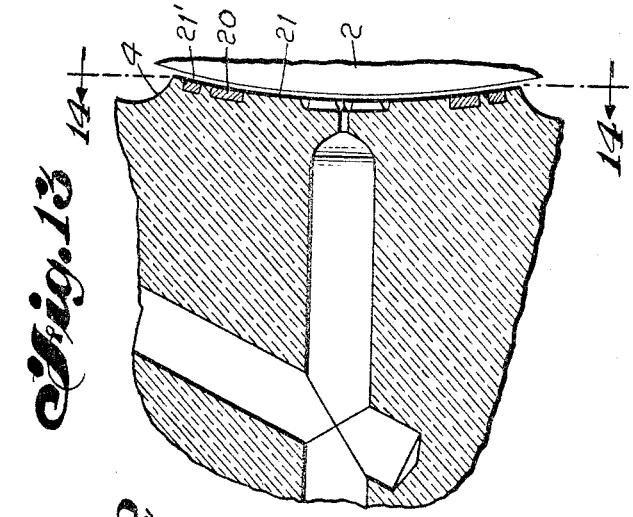
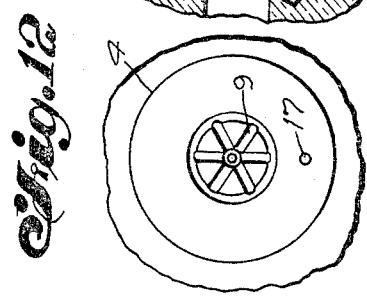
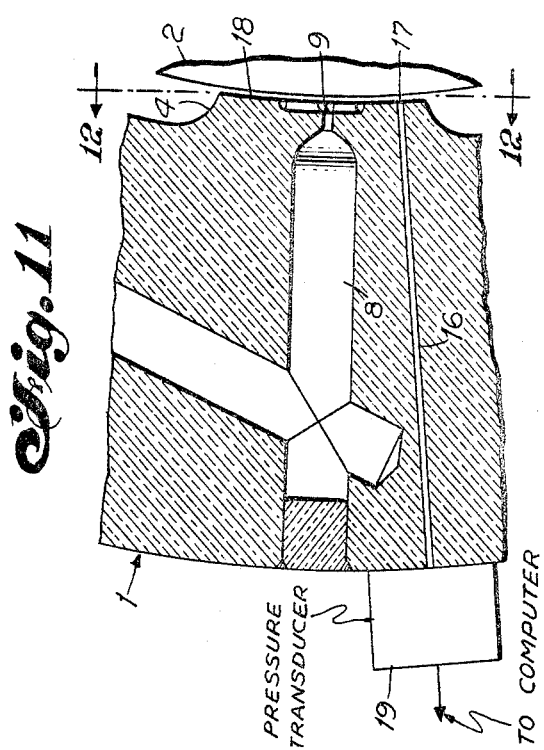
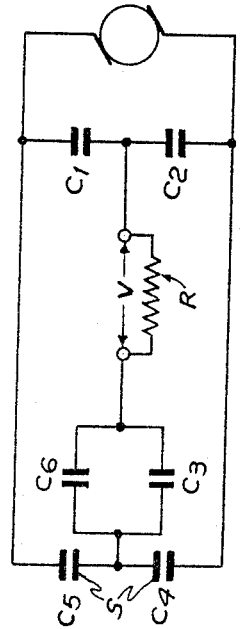
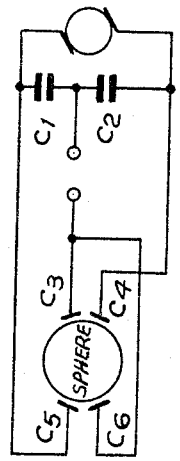
INVENTOR.
GERALD B. SPEEN
BY
ATTORNEY United States Patent Office 3,276,270
Patented Oct. 4, 1966

3,276,270
COMBINED GYROSCOPE AND ACCELEROMETER
Gerald B. Speen, Sepulveda, Calif., assignor to International Telephone and Telegraph Corporation, Nutley, N.J., a corporation of Maryland
Filed Apr. 2, 1962, Ser. No. 184,447
22 Claims. (Cl. 74—5.6)

This invention relates to a highly accurate device which combines the functions of a gyroscope and accelerometer.

In the operation of high speed aircraft, guided missiles or pilotless aircraft and the like, it is desirable to provide means which indicate the deviation of the aircraft from its desired path and which also indicate the acceleration forces acting on the aircraft in order to properly control the flight of the aircraft to its desired objective. Such means must provide reliable and accurate information. In the present state of the art, as is generally known, gyroscopes and accelerometers are separate instruments and also are very expensive to produce particularly where accuracy of a very high order is required. It is very desirable and necessary that such devices as the gyroscope and the accelerometer be produced as economically as possible and to occupy the least possible space and weight in the aircraft.

It is therefore an object of this invention to provide a single device which combines the function of a gyroscope and an accelerometer having accuracy of an extremely high order.

It is another object to utilize the same type of bearings for both the functions of a gyroscope and accelerometer in the same device.

The uniqueness of this invention is disclosed in a device which combines in one unit both the functions of a highly accurate gyroscope and accelerometer. This is made possible by virtue of the fact that the bearing means for support of the rotor of the gyroscope, which is also the force-responsive element of the accelerometer, is equally adaptable to serve both functions. The sensing means for the gyroscopic function and for the accelerometer functions are necessarily distinct as will be shown when the invention is described in detail. The unique and novel construction of the combined gyroscope-accelerometer of this invention makes possible an economical and accurate navigation instrument which reduces the complexities and expense of two separate devices, a gyroscope and an accelerometer.

A feature of this invention is a device which comprises in combination a housing, a rotor and means rotatably supporting the rotor for relative movement with respect to the housing. The supporting means comprises a plurality of pairs of separate gas bearings with the gas bearings of each of said pairs disposed in opposed axial relation. The rotor has bearing means disposed in coactive association with the gas bearing pads of each of said pairs. There are means provided within the housing to supply gas to the bearings, means for sensing changes in the spaces between the rotor and the bearing surface caused by changes in the rate of movement of the vehicle and means for sensing changes in the angular orientation of the rotor with respect to the housing.

Another feature is that in several embodiments the housing is stationary and the rotor is rotated.

Still another feature is that in other embodiments the housing rotates and the rotor rotates with the housing to provide an even greater degree of accuracy.

The above-mentioned and other features and objects of this invention will become more apparent by reference to the following description taken in conjunction with the accompanying drawings, in which:

FIG. 1 is a cross section view of one embodiment of this invention showing a stationary housing;

FIG. 2 is a cross section view of another embodiment of this invention showing a stationary housing;

FIG. 4 is still another embodiment of this invention showing a stationary housing;

FIG. 5 is a cross section view of the cylindrical journal bearing of FIG. 4 along line 5—5;

FIG. 6 is a cross section view through the gimbal system of FIG. 4 along the line 6—6;

FIG. 7 is a cross section view through the gimbal and cylindrical gyroscope and accelerometer of FIG. 4;

FIG. 11 is an enlarged view of one of the gas bearing pads shown in cross section in FIGS. 1, 2 and 8;

FIG. 12 is a plan view of the gas bearing pad of FIG. 11;

FIG. 13 is an expanded cross sectional view of the gas bearing pad with capacitor segments located on the bearing surface thereof;

FIG. 16 shows the electrostatic pickoff sensing means for the accelerometer portion of this invention; and FIG. 17 is the equivalent electrical diagram for the electrostatic pickoff system of FIG. 16.

Figure 3:
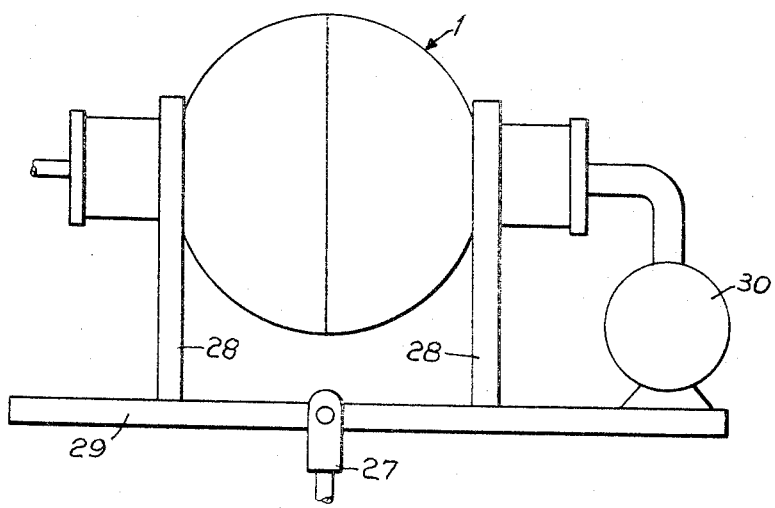
FIG. 3 is a view showing the embodiment of FIGS. 1 or 2 mounted on a gimbal system.

In United States Patent No. 2,940,318, a new type of gyroscope is disclosed that makes use of gas bearings to take advantage of the very low static friction caracteristic of such gas bearings. A pressure, lower than that used in the bearings, is maintained around those parts.

In the co-pending application of P. R. Adams, G. B. Speen, D. E. Brannon, Serial No. 798,556, filed March 10, 1959, now Patent No. 3,110,187, improvements in this new type of gyroscope are disclosed including caging plugs for supporting the movable inner member of the gyroscope when gas is not applied to the gas bearings. Similar types of gas bearings and caging plugs are utilized in this invention for supporting the rotor for relative movement with respect to the housing and in the event that no gas is applied to these bearings, caging plugs similar to that described in the co-pending application are provided for statically supporting the rotor. In a co-pending application of G. B. Speen for "Accelerometer" bearing the Serial No. 801,662, filed March 24, 1959, now Patent No. 3,080,761, there is disclosed a new type of accelerometer utilizing a gas supporting rotor as the inertia member. Referring to the FIGS. 1, 2, 9, 10-14, there is disclosed a housing 1 inside of which is disposed a spherical rotor 2. The rotor 2 is a spherical structure wherein a cylindrical cavity 3 is provided through the sphere thus giving it a predetermined preferred axis of rotation about which its moment of inertia is maximum. The rotor 2 is preferably made of some highly stable material, such as quartz, or some stable, very high density material. The rotor 2 is preferably hollowed to obtain optimum angular momentum. The rotor 2 has a very accurate spherical external form and a very high quality exterior finish so that it can act as a bearing surface cooperating with the accurate spherical surfaces of the gas bearing pads 4. The six gas bearing pads 4 extend inward as shown in the figures from the inside of the housing 1 so that their surfaces match with the surface on the rotor sphere 2 providing a small operating gap. These bearing pads 4 are disposed along three orthogonal axes. Three of them are integral with one half of the housing frame 1 and the other three are integral with the other half of this housing. The gas is conducted and distributed throughout this housing to the six bearing pads by a system of manifolding 5. The bearing surfaces are made large enough to provide adequate load carrying ability but some space is always left between adjacent pads in order to prevent interaction. The gas under high pressure is admitted to the housing through some opening, such as 6 in the end portion 7 and is conducted through the manifold passages 5 to an interior chamber 8 within the gas bearings 4. The gas which exits through the bearing pads 4 into the interior of the housing 1 is fed to the bearing surface through the metering hole 9. The gas is then returned to the pump through the exhaust port 10. To properly support the rotor 2 during such times as this device is not operating, three movable caging plugs 11 are provided within the upper half 12 of the housing 1. Three fixed caging plugs 13 are disposed in the lower half 14 of the housing. The fixed caging plugs are disposed axially opposite to the movable caging plugs 11 and are just slightly higher than the surfaces of the bearing pads 4. Gas under pressure is applied to the movable caging plugs 11 to force them outwardly against the pressure of the springs 15 and thus eliminate the contact between both the fixed and movable caging plugs against the surface of the spherical rotor 2 during the time that the device is in operation. A sampling hole 16 connects the gap 17 between the surface of the spherical rotor 2 and the bearing surface 18 of the bearing pad 4 to a pressure transducer 19 disposed on the outside surface of the housing 1. In this embodiment, six bearing pads, three pairs arranged mutually orthogonal and opposing each other is the preferred embodiment for determining acceleration forces along three coordinate axes. However, several arrangements of individual pads may be used with an increase in computing difficulty. Naturally, the number of pads and their arrangement must be such that the suspended element is acted upon equally along all the coordinate axes. Six or twelve pads accomplish this best for a sphere. The accelerometer sensing means disclosed in the FIGS. 1, 2, 11 and 12 is a pressure monitoring system. The pressure is measured within the space 17 through the monitoring hole 16 and any well known pressure transducer 19 will produce an electrical signal analogous to the pressure existing in the space 17. The output signals of the pressure transducer 19 can be used in any computer (not shown) that can multiply and divide and compute square roots to obtain acceleration. There are computers available today which will provide these functions. It is preferable to use a differential pressure transducer so that only one will be required for each axis to sample pressures on both sides. However, as shown in the illustration, a transducer can be used at each end of each axis to obtain the same information. Another variation is to use only one pressure transducer sampling only one bearing of a pair and use that information only, as obviously a decrease in pressure at one end means a corresponding increase in pressure on the other side.

Figure 14:
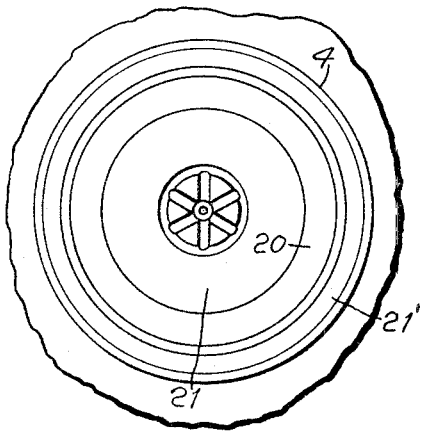
FIG. 14 is a plan view of the gas bearing pad with capacitor elements of FIG. 13.
Figure 10:
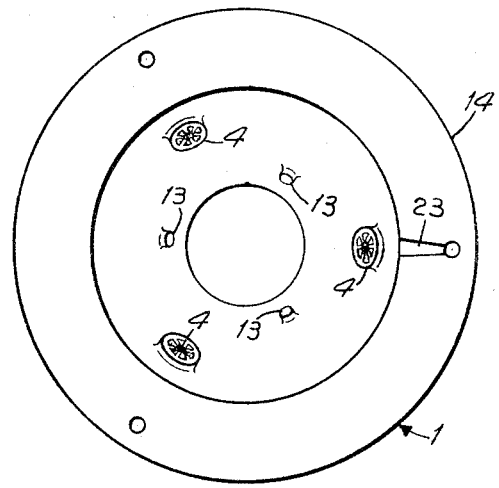
FIG. 10 is a cross sectional view along line 10—10 of FIG. 1 of this invention.
Figure 15:
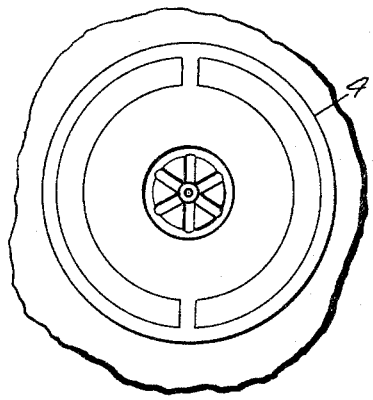
FIG. 15 is a plan view of the gas bearing pad similar to that of FIG. 13 and showing two semi-circular capacitor segments formed from one annulus disposed on the bearing surface of the gas pad.

Figs. 13, 14 and 15 illustrate an electrostatic pickoff which can be applied as the sensing means for this accelerometer. The gas bearing 4 is provided with two capacitor plates, such as concentric rings 20 and 21', disposed on the bearing surface. The housing 1 may be made of non-conductive material, such as glass or quartz, as mentioned above, and the capacitor rings 20 and 21' may be made of a conductive material which may be evaporated onto the surface 21 or the surface 21 may be machined to receive the conductive material of the capacitor rings 20 and 21' so that they are flush with the surface 21. The spherical rotor 2 may be a glass or quartz sphere coated with a thin conductive film or a metallic sphere preferably made of an aluminum alloy either hollow or solid. Two pairs of capacitor rings or plates 20 and 21' are necessary for each axis of sensitivity. Therefore, for the three axis embodiment, such as the sphere, 12 rings are used, each gas bearing having two capacitor plates as shown in FIGS. 13 and 14. In multi-axis operation, the three axes of pickoffs are identical so only one axis system will be described since this can obviously be extended to the three axes.

In FIGS. 16 and 17, there is shown a capacitive pickoff system utilizing the sphere and an equivalent electrical circuit therefor for a one axis system. $C_5$ and $C_6$ may be considered equivalent to the conductive rings 20 and 21 on one gas bearing acting in relation to the conductive surface of the sphere. $C_3$ and $C_4$ are formed with the conductive rings on the gas bearing disposed axially opposite to the gas bearing containing the capacitor plates $C_5$ and $C_6$. It should be noted that the four capacitors formed by this arrangement makes it possible to sense a change in the position of the spherical rotor 2 without any connections or leads on the sphere. The equivalent circuit of FIG. 17 is an A.C. bridge which becomes unbalanced when the spherical body moves closer to one pad or the other and a signal voltage V is produced across the resistor R. $C_1$ and $C_2$ are the fixed impedance arms of the bridge. The voltage output is not linear with respect to the spacing between the plates of conductive rings and the spherical rotor 2, but is quite predictable. Therefore, the change in the spacing can be detected and consequently the acceleration acting on the vehicle. One of the capacitor plates in each of the capacitors $C_3$, $C_4$, $C_5$ and $C_6$ marked S are all really the metallic surface of the spherical body 2. The location of the capacitor plates 20 and 21' can be as in FIGS. 13 and 14 or FIG. 15, though it is to be understood that there are other ways of providing for conductive capacitor plates. Separate electrodes, i.e., capacitor plates, for example, can be placed in opposing pairs in a similar manner as the pads but rotated so that they lie between the pads, or these electrodes could be placed, say four around the equator and one at each pole. However, in all cases, all the capacitor plates should preferably be of equal area so that the capacitances of all the capacitors will be equal. It is possible to have the capacitor plates made of sheet metal and formed to conform with the surface which constitutes the opposing electrode and supported on insulators. When an acceleration force acts on the sensitive element or the rotor 2, it moves in the direction of this acceleration. If we assume that this is along the axis of a bearing pad pair then the element moves toward a given pad by an amount which is related to the difference between the end thrusts of that pad and of the opposing pad. When the force due to the difference in thrust equals the force due to the mass of the suspended element multiplied by the acceleration, the element or the inertia body stops. The electrodes around the pads see a change in capacitance due to the change in distance between the electrode plates on the bearing pads and the surface of the conductive element. The acceleration is then computed from the bridge reading which results from the changes in separations that result from the end thrusts balancing the acceleration force. The acceleration computed in this way along each or all sensitive axes gives the necessary information. If the acceleration force is acting not along any of the coordinate axes, the acceleration is then automatically resolved into components along the three pad axes and each component considered separately.

To make the device operate as a gyroscope as well as an accelerometer, it is necessary to provide for rotation of the rotor in FIG. 1. To do this, there is provided at least one nozzle 23 which is connected to part of the gas manifold system 5. More than one can be provided as may be required. On the rotor itself there is disposed a plurality of buckets 24 around the equator of the sphere on which the nozzle 23 or plurality of nozzles, as the case may be, is trained. When gas is supplied to the unit, the sphere would be supported on the gas bearing pads and allow it to float and further, the gas would be exiting through the nozzles and impinging on the buckets such that it would cause the rotor 2 to spin and act as a gyroscope. Therefore, this would be an entirely pneumatic system. The buckets can be simply cut right into the surface of the sphere around the equator.

An alternative method of spinning the rotor 2 is shown in FIG. 2 where a set of windings 25 is disposed around the equator of the rotor 2 embedding them into the surface and another set of windings 26 is disposed in the inner part of the housing 1 around the equator thereof adjacent to the rotor equator so that when electrical power (not shown) is supplied to the stator windings, the rotor is caused to spin up just like an ordinary squirrel cage electric motor. In either case, in the embodiment of FIGS. 1 or 2 what is shown is a sphere rotating within a fixed case supported on a set of gas bearing pads to act as a gyroscope.

Figure 8:
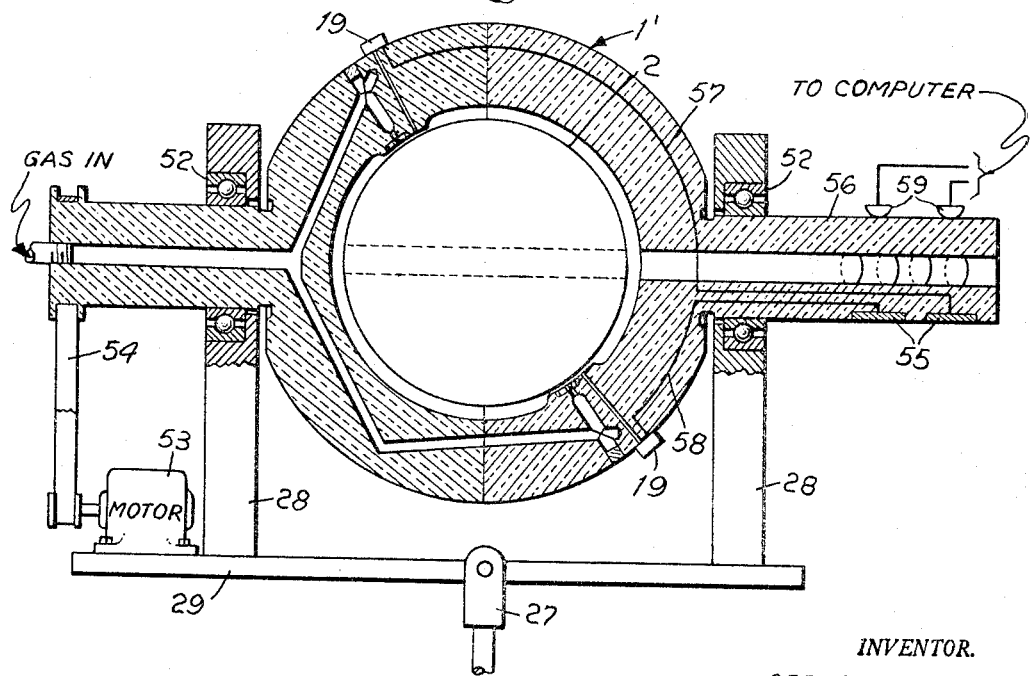
FIG. 8 is another embodiment of the combination gyroscope and accelerometer wherein both the housing and the rotor rotate.
Figure 9:
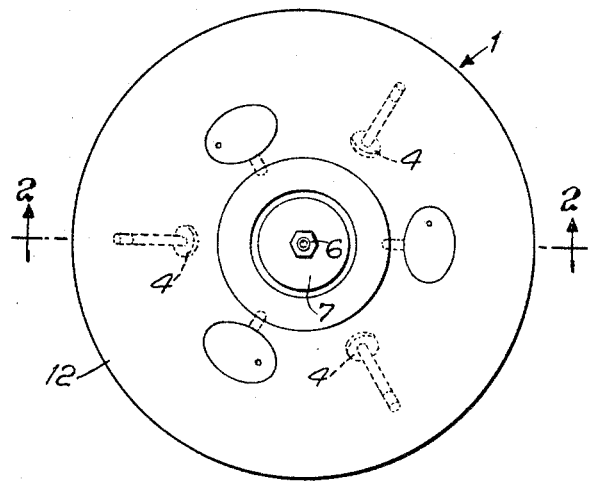
FIG. 9 is an end view of the device of this invention.

The very precise and accurate pickoff arrangement (not shown) which is provided between the rotor 2 and the housing 1 detects any deviation in position between these two units resulting from some motion of the vehicle carrying the system. With the device mounted on a gimballed platform 29 as shown in FIGS. 3 and 8, the signals thus obtained are carried to a high response servo system (not shown) which converts these signals into the necessary electrical impulses which are applied to the proper torquers in the gimballing system 27 so as to always maintain the housing 1 in line with the rotor 2 and keep the pickoff readings at null. This results in a platform system that is stabilized in an inertial frame of reference. The sensitive pickoff must precisely determine any deviation in the alignment of the rotor 2 with respect to the housing 1 about all the axes except the axis of rotation. As shown in FIG. 3, the combination gyroscope and accelerometer is supported by a pair of supports 28 which is attached to a base 29 that is controlled as to position by the gimballing system 27 as described above. A pump 30 is disposed on the base 29 to provide the necessary gas under pressure to the system. The gyro configuration (non-rotating housing) can also be applied like conventional gyroscopes used in in inertial systems as well by providing torquers in the gyro to torque the rotor. An example of a pickoff system that can be used for sensing angular deviations in the rotor is described in Patent No. 3,110,187 referred to above. The pickoff system 70 can be disposed adjacent the window 71 to allow transmission of a light beam from a light source in the pickoff system 70 through the window 71 and the cavity 3 and reflected from a mirror (not shown) carried by the rotor 2 at the end of the cavity 3. A transparent balancing disk (not shown) which has similar properties both in weight and mass distribution as the mirror, is placed in the opposite end of the cavity 3 to properly balance the weight of the mirror.

Referring now to FIGS. 4 and 5 there is shown a cylindrical mass 31 which is rotating in a journal bearing 32 to give a gyroscopic effect. The cylindrical mass 31 is supported along its axis of rotation by two thrust bearings 33 so that full support is provided. The width of the journal bearing 32 must be wide enough so that the tilt of mass 31 within the journal bearing 32 is not too great. Additionally, to support the cylindrical mass 31, there are provided in the journal bearing, metering holes 34 disposed circumferentially around the inner surface thereof, in two concentric circles 35 and 36. These can be simply small diameter holes drilled into the journal bearing to the connecting ducts 37 which in turn are connected to the manifolding system of this embodiment as shown in FIGS. 6 and 7. In the figures referred to, gas comes into the fixed gimbal ring 38 through a duct 39 and is led through ducts 40 until it comes into the connecting pin 41 which connects gimbal 38 to the vertically disposed gimbal 42. Gas then goes from duct 40 through connecting pin 41 into a duct 43 which is within the vertical gimbal 42. As shown in FIG. 7, the gas comes through the duct 43 then through the pin 44 coupling the gimbal 42 to the frame 45. Then the gas goes through duct 46 to the thrust bearings 33 which have a configuration similar to that of bearings 4 shown in the embodiments for the spherical rotors with the exception that the surface of the bearing 33 is flat to conform with the configuration of the end surface of the cylindrical mass 31. The gas from duct 43 also passes into duct 47 which leads through the frame 45 into the journal bearing 32 where it is divided as follows. The gas goes through the ducts 37 to supply the gas bearing metering holes 34 in the groups 35 and 36. Also, there is provided at least one nozzle 49, though more may be provided if necessary, disposed at an angle adjacent the equator of the cylindrical mass 31. Around the surface of the mass 31 are cut, preferably in the surface of the cylindrical mass 31, buckets 50 upon which the gas discharged from the nozzles 49 impinges to cause the cylindrical mass to rotate at a high rate of speed. The cylindrical assembly 45 is thus stabilized gyroscopically about two axes. Any motion of the vehicle will cause the gimbals to adjust their position so that the cylindrical assembly 45 remains fixed in inertial space. Vehicle motions are determined using conventional pickoffs, such as potentiometers or synchros, between the gimbal elements 38 and 42 and between 42 and 45. To sense any accelerating forces acting on the cylindrical mass, there are disposed transducers 19 similar to the transducers described above which are connected to the spaces between the bearing surface of bearing 33 and the end surfaces of cylindrical mass 31 by a sampling duct 51 which thus transmits the changing gas pressure of the spaces to the transducer 19 from which the electrical signals are picked off as described above. Additionally, other transducers 19' may be disposed about two coordinate axes perpendicular to the axis of the cylinder on the equator of the cylindrical mass 31. This arrangement of transducers at the axial ends of the cylindrical mass as well as on the two axes perpendicular to the cylindrical axis provides for a resolution of the acceleration forces acting on this device into three orthogonal axes. The radially disposed transducers 19' are, of course, offset from the manifold arrangement for the gas supply to the bearings 34 and the nozzles 49. The output information from the transducers is usable in the same manner as described above. The gimbal pivots need not be of the type shown in the figures, but may be gas lubricated or use ball bearings well known to those skilled in the art. The gimbal 38 is fixed with respect to the vehicle and the gimbal 42 is free to rotate about the axis perpendicular to the spin axis. The cylindrical mass 31 may be considered as a gyroscope which is rigid in its support; that is, the gaps in the gas bearings are made very small so that, if the vehicle moved, there would be enough gyroscopic inertia from the rotating cylinder to maintain the outer cylinder fixed to it in inertial space. Therefore, the gimbals allow rotational freedom about both perpendicular axes or sensitive axes. In this case, the purpose of the gimbals is different from the spherical rotor embodiments where the gimbals are used to keep the fixed case or housing lined up with the spherical rotor so that there is low drift in the rotor itself. In the case of the cylindrical rotating mass, the gimbals provide a means so that the fixed frame can remain spacially fixed when the vehicle moves because it really acts quite similar to a conventional gyro. Therefore, the cylindrical embodiment can be considered as a merely directional gyroscope which has a supported rotating member inside of a fixed member. However, by making the spaces between the rotating and the fixed members very small, greater accuracy can be secured.

Referring now to FIG. 8, there is shown the embodiment with the rotating housing. The rotating housing 1' is mounted in mechanical bearings 52 which may be ball bearings, as shown, or gas bearings or any other bearings that may be desired, mounted in the support 28 disposed upon the base 29. The frame 1' is spun by an external driving mechanism, such as the motor 53, connected to the shaft by means of a belt 54. However, any other means of propulsion, such as a gas turbine, can be utilized. It is obvious that the friction in the bearings 52 will have no effect on the accuracy of the instrument. If the housing 1' were suddenly spun in this manner while the rotor 2 was supported on the gas bearing pads, the rotor 2 would be left far behind and a very long period of time would elapse before the extremely low gas bearing friction could bring rotor 2 up to the speed of the housing 1'. In the usual practical case, it is desirable to bring the rotor 2 up to operating speed almost immediately. This may be accomplished through the use of the caging apparatus described above for the other embodiments and which secures the rotor sphere 2 to the housing 1' during both the spin up period and also the slow down period when the instrument is turned off. When the desired operating speed is reached, the caging mechanism releases the rotor 2 which is then supported only on the gas bearings. Once the rotor 2 and the housing 1' are rotating together, they will continue to do so as a result of the minute bearing frictions and "windage" effects since the gas within the unit is also rotating with the parts. The pump or high pressure gas source, not shown in this embodiment, supplies the gas through a rotating joint or gas slip ring mechanism (not shown) into the rotating gyroscope assembly. The gas is conducted through the manifolding passages in the housing 1' in the same manner as described above. The complete assembly is also mounted on the base 29 or it may be mounted within a gas-tight enclosure to provide a closed cycle compression system. The base 29 is gimballed through the gimballing system 27 so that the necessary number of degrees of freedom is obtained. Conventional torquers (not shown) are provided at the junction between gimbals and between gimbal and platform as necessary. The pickoff and servo system for the gyroscope is similar to the one described above for the stationary housing. An example of a system for stabilizing a gyro platform through the use of torquers and servomechanisms responding to error signals, such as described here, is described in U.S. Patent No. 2,949,785.

It should be noted that the rotational velocities of the rotor and the housing need not be identical and as a matter of fact, in some cases it might be useful to have them rotating at different velocities. It is obvious that it is simplest and easiest to have the two rotate at the same velocity, since then the process of bringing the rotor up to speed requires only a simple caging mechanism, whereas if the rotor is to be spun at a higher velocity, some supplementary means of spin up must be provided in addition to the caging mechanism. The usefulness of an extra high speed rotor is obvious, however, when consideration is given to an application such as a ballistic missile where the greatest precision is required for only a short period during the initial part of its flight. If the rotor is initially spun up by some additional techniques, such as magnetic induction, to a much higher velocity than that of the housing and allowed to coast, it will very gradually slow down by itself toward the speed of the housing as a result of the minute frictions existing in the gas bearings. This process can take a considerable length of time and during this period, much lower drift rates can be expected since drift decreases with increased angular momentum and therefore angular velocity. Finally, when the speed of the rotor equals that of the intermediate frame 1', the two will continue to rotate at the same velocity and the normal drift rate of the gyroscope will be apparent from then on, thus extra low drift rates can be obtained during the initial period of operation.

The information derived from the transducers for measuring acceleration is rotated with the housing. Therefore, it is not possible just to take a single transducer output and find it useful because the information would be varying as the housing 1' rotates. Therefore, it is necessary to resolve the transducer output signals into a fixed or stationary system. As shown here, commutator plates 55 are provided. The transducers are either the pressure transducers 19, as shown in FIG. 8, or they may be the capacitor type described above. The output of the transducers are brought out to the commutator plates 55 disposed on the shaft 56 by means of leads 57 and 58. In this embodiment, only two transducers and two leads and two commutator plates are shown in section for purposes of illustration. The commutator plates 55 are made large enough such that they provide reliable output information and at the same time are not so large that information is degraded because of inaccuracy due to a changing output as the rotation takes place. The six transducers measure some parameter related to acceleration such as pressure or gap height, and the information is resolved into a coordinate system which is fixed to the platform. The platform, therefore, will receive the electrical outputs and the accelerations that are measured will be measured with relation to the platform coordinate system; i.e. inertial space. That is, the platform operates in such a way as to maintain the housing in alignment with the rotor so that an inertial position is kept fixed and accelerations are measured in relation to it. Only one pair of wipers 59 have been shown in position. Actually, there must be three pairs of wipers located in a configuration 120° apart so that there is produced acceleration information which is merely split up along three axes, the three axes being inclined with respect to the spin axis to lie along the axes of the gas bearing pads. Therefore, every time a pair of commutator plates comes under one of the wipers which is positioned 120 degrees to the next one, information is obtained from the transducer that happens to be in that position. The output information is therefore constant with respect to rotational position and what is really obtained is a pulsating output from the commutators corresponding to a single coordinate axis for each of the three pairs of transducers. This is adequate to use for measuring accelerations since, knowing the angle that the transducers make with respect to the spin axis, it is possible to compute the component of acceleration as referred to the spin axis and therefore all of the acceleration information needed is obtained by processing the outputs externally. This can be done by feeding the outputs to any suitable computer (not shown).

While I have described above the principles of my invention in connection with specific apparatus, it is to be clearly understood that this description is made only by way of example and not as a limitation to the scope of my invention as set forth in the objects thereof and in the accompanying claims.

I claim:
1. A device for use with a moving vehicle comprising
    a housing,
    a body,
    gas bearing means supporting said body for relative movement with respect to said housing,
    means for sensing changes in the spaces between said body and said housing caused by changes in the rate of movement of said vehicle to produce an output signal indicative of the magnitude and direction of said relative movement of said body with respect to said housing,
    and means for sensing changes in the angular orientation of said body with respect to said housing.
2. A device for use with a moving vehicle comprising
    a housing,
    a body,
    means rotatably supporting said body for relative movement with respect to said housing,
    said supporting means comprising a plurality of separate gas bearings, said body having bearing means disposed in coactive association with said gas bearings, means associated with said housing to supply gas to said bearings, means for sensing changes in the spaces between said body and said housing caused by changes in the rate of movement of said vehicle to produce an output signal indicative of the magnitude and direction of said relative movement, and means for sensing changes in the angular orientation of said body with respect to said housing.

3. A device according to claim 2 wherein said housing is stationary and further including means associated with said housing to rotate said body.

4. A device according to claim 3 wherein said means to rotate said body comprises at least one nozzle disposed in said housing, means coupling said gas to said nozzle and means disposed on said body adjacent to said nozzle and coacting with the gas discharged from said nozzle whereby said body is rotated by the discharged gas.

5. A device according to claim 3 wherein said means to rotate said body comprises a first electrical winding disposed in said housing, a source of energy coupled to said first electrical winding, and a second electrical winding disposed on said body in coactive relationship with said first electrical windings.

6. A device for use with a moving vehicle comprising a housing, a rotor, means rotatably supporting said rotor in spaced relation for relative movement with respect to said housing.

said supporting means comprising a plurality of pairs of separate gas bearing pads with the gas bearings of each of said pairs disposed in opposed axial relation, said rotor having bearing means disposed in co-active association with said gas bearing pads of each of said pairs, means associated with said housing to supply gas to said bearings, means for rotating said rotor, means for sensing changes in said spaced relation between said rotor and said housing caused by changes in the rate of movement of said vehicle to produce an output signal indicative of the magnitude and direction of said relative movement and means for sensing changes in the angular orientation of said rotor with respect to said housing.

7. A device according to claim 6 wherein said bearing pads comprise gas bearings and said rotor is spaced apart from said bearing pads by gaps, said housing includes means to supply gas to said bearing pads and said sensing means for said change in rate of movement include a pressure transducer and at least one of said bearing pads includes a hole connecting the input of said pressure transducer with said gap separating said rotor from said bearing pads whereby said pressure transducer will sense changes in the gas pressure in said gap caused by movement of said rotor.

8. A device according to claim 6 wherein said sensing means for said relative movement comprise electrostatic elements supported from said housing and disposed adjacent the surface of said rotor, said surface comprises conductive material and each said element and said surface form an electrostatic capacitor, and means coupled to said electrostatic elements to derive an output signal when said relative movement occurs.

9. A device according to claim 8 wherein said means coupled to said electrostatic elements include a source of alternating current and a pair of fixed impedances to comprise together with an opposed pair of said capacitors an alternating current bridge whereby an output signal is derived indicative of said relative movement in the direction of the axis connecting said pair of capacitors.

10. A device according to claim 9 wherein said electrostatic elements are supported on the bearing surfaces of said bearing pads.

11. A device according to claim 10 wherein said electrostatic elements comprise at least two concentric rings on the bearing surface of each gas bearing pads, each said ring forming with said conductive surface an electrostatic capacitor.

12. A device according to claim 10 wherein said electrostatic elements comprise two semicircular segments of an annulus disposed on the bearing surface of each gas bearing pad, each said segment forming with said conductive surface an electrostatic capacitor.

13. A device for use with a moving vehicle comprising a housing, means disposing a spherical body centrally within said housing, said disposing means comprising a plurality of pairs of gas bearing pads supporting said body in spaced relation for relative movement with respect to said housing when the rate of movement of said vehicle changes, each of said pairs being disposed in opposed axial relation along three orthogonal axes, said body having bearing means disposed in coactive association with the gas bearing pads of each of said pairs, means associated with said housing to supply gas to said bearing pads, means for rotating said body, means coupled to said housing for sensing any change in said spaced relation caused by any change in said rate of movement of said vehicle and responsive to change in said spaced relation to produce an output signal indicative of the magnitude and direction of said relative movement along said orthogonal axes and means to sense changes in the angular orientation of said body with respect to said housing.

14. A device for use with a moving vehicle comprising a housing, means disposing a spherical rotor centrally within said housing, said disposing means comprising a plurality of pairs of gas bearing pads supporting said rotor in spaced relation for relative movement with respect to said housing when the rate of movement of said vehicle changes, each of said pairs being disposed in opposed axial relation along three orthogonal axes, said rotor having bearing means disposed in coactive association with the gas bearing pads of each of said pairs, means associated with said housing to supply gas to said bearing pads, means for rotating said housing, means coupled to said housing for sensing any change in said spaced relation caused by any change in said rate of movement of said vehicle and responsive to changes in said spaced relation to produce an output signal indicative of the magnitude and direction of said relative movement along said orthogonal axes and means to sense changes in the angular orientation of said rotor with respect to said housing.

15. A device according to claim 14 further comprising means for rotating said rotor at a speed greater than the speed of rotation of said housing prior to use and allowing said rotor to coast down to the speed of rotation of said housing during the first period of use.

16. A device according to claim 14 wherein said means for sensing changes in said spaced relation comprises commutator means for resolving the output of said sensing means along fixed coordinate axes.

17. A device according to claim 16 wherein said commutator means couple the outputs of pairs of axially disposed sensing means for resolving the outputs of said sensing means along the fixed coordinate axes.

18. A device for use with a moving vehicle comprising
a housing,
a cylindrical body,
a plurality of bearings supporting said body in spaced relation for relative movement with respect to said housing along the axis of said cylinder when the rate of movement of said vehicle changes,
said bearings comprising a plurality of gas bearings disposed in coactive association with the cylindrical surface of said cylinder
and a gas bearing pad protruding inwardly from the inner surface of said housing toward said body and disposed adjacent each end surface of said cylinder, gaps separating said body from said bearings,
means for rotating said cylindrical body,
means for sensing changes in the angular orientation of said body with respect to said housing
and means coupled to said housing for sensing any change in at least one of said gaps between said end surfaces of said cylinder and said gas bearing pads adjacent thereto caused by any change in said rate of movement of said vehicle and responsive to change in said gap to produce an output signal indicative of the magnitude and direction of said relative movement along said axis.

19. A device according to claim 18 further comprising means for sensing changes in the gaps between the cylindrical surfaces of said body and said gas bearings disposed about two coordinate axes perpendicular to the axis of the cylinder.

20. A device according to claim 19 and further comprising at least 2 gimbals supporting said housing to said vehicle to allow at least two degrees of rotational freedom.

21. A device according to claim 19 and further comprising pickoff means disposed between said gimbals to obtain angular orientation of said housing with respect to said vehicle.

22. A stabilized system comprising
a frame rotationally supported from a vehicle but adapted normally to remain approximately rotationally fixed in space,
a housing mounted on said frame for rotation about a given axis,
a rotor,
means rotatably supporting said rotor revolves said housing for relative movement with respect to said housing and affording said rotor at least two degrees of freedom of tilting of its axis,
said supporting means comprising a plurality of pairs of separate gas bearing pads,
the gas bearing pads of each of said pairs being disposed in opposed axial relation,
said rotor having bearing means disposed in coactive association with the gas bearing pads of each of said pairs,
means associated with said housing to supply gas to said bearings,
means for steadily rotating both said housing and said rotor with respect to said frame whereby precession drifts are continually neutralized,
servo means for tilting said frame in such a direction as to reduce any misalignment of said given axis and said rotor axis,
and means for sensing changes in the spaces between said gas bearing pads and said rotor caused by changes in the rate of movement of said vehicle to produce an output signal indicative of the magnitude and direction of said relative movement.

References Cited by the Examiner
UNITED STATES PATENTS

| | | | |
|---|---|---|---|
| 2,534,824 | 12/1950 | Jones | 74—5.6 |
| 2,821,859 | 2/1958 | Crockett | 74—5.6 |
| 2,852,942 | 9/1958 | Gerard | 74—5.6 |
| 2,878,006 | 3/1959 | Sedgfield et al. | 74—5.6 X |
| 2,940,318 | 6/1960 | Adams et al. | 74—5 |
| 2,968,954 | 1/1961 | Mueller | 74—5.6 |

FRED C. MATTERN, JR., *Primary Examiner.*

BROUGHTON DURHAM, *Examiner.*

T. W. SHEAR, *Assistant Examiner.*